UNITED STATES PATENT OFFICE.

JULIUS H. TIEMANN, OF NEW YORK, N. Y., ASSIGNOR TO HIMSELF AND ANDREW F. PICKENS.

IMPROVEMENT IN THE MANUFACTURE OF PAPER.

Specification forming part of Letters Patent No. 123,747, dated February 13, 1872.

SPECIFICATION.

*To all whom it may concern:*

Be it known that I, JULIUS H. TIEMANN, of New York, in the county of New York, and in the State of New York, have invented a new and useful Improvement in the Manufacture of Paper; and I do hereby declare that the following is a full, clear, and exact description thereof.

My invention relates to the process of preparing the pulp immediately previous to its fabrication into paper, and consists in treating it with alum, as hereinafter set forth.

I am aware that clay, lime, and other substances have been added to paper-pulp in order to give the paper greater consistency and weight and a better finish. These substances or compounds have been introduced into the engine or vats containing the pulp in a pulverized state, or mixed with water to the consistency of paste, but very little of the material so applied unites with the pulp, being washed away and lost; and that which remains merely forms a coating on the outside of the fibers, and tends to make the paper hard and thin, which is especially objectionable in book papers.

In my process I introduce alum, a sulphate of alumina or clay into the vessel containing the pulp, which, being perfectly soluble in water, becomes dissolved and thoroughly penetrates each fiber. I now add freshly-burned lime, which has been previously slacked, and a precipitate of hydrate of alumina and sulphate of lime is formed not only on the surface but in the very interior of each fiber, causing the latter to swell in a slight degree. The substances thus thoroughly incorporated are no longer foreign matter as in the case of clay, &c., added in the ordinary manner, but form a part of the pulp itself. Furthermore there is little or no loss of material.

I claim—

The process herein described, of introducing alum into paper by introducing the same into the vessel containing the paper-pulp, and causing it to come in contact, in solution, with and penetrate the fibrous matter, and then by the addition of caustic lime to form a precipitate within and upon the surface of the fibers, substantially as and for the purpose set forth.

J. H. TIEMANN.

Witnesses:
A. F. PICKENS,
E. L. TIEMANN.